United States Patent
Zhan et al.

(10) Patent No.: US 9,612,481 B2
(45) Date of Patent: Apr. 4, 2017

(54) DISPLAY SUBSTRATE, METHOD FOR MANUFACTURING THE SAME, AND LIQUID CRYSTAL DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Hongming Zhan, Beijing (CN); Ming Chen, Beijing (CN); Xiong Jin, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/485,235

(22) Filed: Sep. 12, 2014

(65) Prior Publication Data

US 2015/0362780 A1    Dec. 17, 2015

(30) Foreign Application Priority Data

Jun. 11, 2014 (CN) .......................... 2014 1 0259351

(51) Int. Cl.
*G02F 1/1337* (2006.01)
*G02F 1/1339* (2006.01)
*G02F 1/1333* (2006.01)

(52) U.S. Cl.
CPC ...... *G02F 1/133788* (2013.01); *G02F 1/1337* (2013.01); *G02F 1/133753* (2013.01);
(Continued)

(58) Field of Classification Search
CPC ......... G02F 1/133788; G02F 1/133753; G02F 1/13378
See application file for complete search history.

(56) References Cited

U.S. PATENT DOCUMENTS

2006/0172091 A1    8/2006  Tung et al.
2007/0085951 A1*   4/2007  Hale ................... G02F 1/13363
                                                      349/117

FOREIGN PATENT DOCUMENTS

CN        102520551 A    6/2012
CN        102591060 A    7/2012
(Continued)

OTHER PUBLICATIONS

Translation of JP58215628, Kokai, Method for Forming Orientation-Controlling Film for Liquid Crystal Display Element.*
(Continued)

*Primary Examiner* — Phu Vu
(74) *Attorney, Agent, or Firm* — Harness, Dickey & Pierce, P.L.C.

(57) ABSTRACT

A display substrate, a method for manufacturing the same, and a liquid crystal display device are disclosed. In the present disclosure, an alignment film layer is formed on the display substrate and a shield by placing the shield on the display substrate and using the shield as a barrier, wherein, an enclosed region is enclosed by the shield, a inner edge of the shield is located between the display region and a sealant region of the display substrate, and an outer edge of a non-display region of the display substrate is located within a region where the shield is located. Then the shield is peeled off and an aligning process is performed to form an alignment layer.

19 Claims, 4 Drawing Sheets

(52) U.S. Cl.
CPC ............... *G02F 1/1339* (2013.01); *G02F 2001/133388* (2013.01); *G02F 2201/50* (2013.01); *Y10T 428/24752* (2015.01)

(56) References Cited

FOREIGN PATENT DOCUMENTS

| | | |
|---|---|---|
| CN | 102929042 A | 2/2013 |
| JP | 58215628 | * 12/1983 |
| JP | S58215628 A | 12/1983 |

OTHER PUBLICATIONS

First Office Action regarding Chinese application No. 201410259351.4, dated Apr. 5, 2016. Translation provided by Dragon Intellectual Property Law Firm.
Second Office Action regarding Chinese application No. 201410259351.4, dated Dec. 2, 2016. Translation provided by Dragon Intellectual Property Law Firm.

\* cited by examiner

DISPLAY SUBSTRATE, METHOD FOR MANUFACTURING THE SAME, AND LIQUID CRYSTAL DISPLAY DEVICE

CROSS-REFERENCE TO RELATED APPLICATION

This application claims priority to Chinese Patent Application No. 201410259351.4 filed on Jun. 11, 2014, the disclosures of which are incorporated in their entirety by reference herein.

TECHNICAL FIELD

The present invention relates to the field of liquid crystal display technology, in particular to a display substrate, a method for manufacturing the same, and a liquid crystal display device.

BACKGROUND

A thin film transistor liquid crystal display (TFT-LCD) has the characteristics of small size, low power consumption, no radiation, relatively low cost on manufacturing, etc., and occupies a dominant position in the current market of flat panel displays. The main structure of the TFT-LCD is an array substrate and a color filter substrate which are oppositely arranged to form a cell. A sealed space is formed between the array substrate and the color filter substrate by a sealant. In the sealed space, liquid crystal molecules are filled. The sealant is located in a non-display region on a periphery of a display region. A functional film layer is also formed inside of the array substrate and the color filter substrate, the functional film layer is used to ensure that the liquid crystal molecules are aligned as required, so as to form a pretilt angle. The functional film layer is also known as an alignment layer.

As a further pursuit of the visual appearance of a display, a narrow-frame flat panel display has become a trend of the future. In the narrow-frame flat panel display, the non-display region is very small. Since there is a process deviations for coating the alignment layer and an edge of the alignment layer has a region having nonuniform thickness, it is difficult for the alignment layer to ensure that the display region is covered completely and ensure a normal display of the display region, while not being interfered with the sealant region and not affecting the product quality.

SUMMARY

The present disclosure provides a display substrate, a method for manufacturing the same, and a liquid crystal display device, to solve the problem that a non-display region is very small in a narrow-frame flat panel display, and since there is a process deviations for coating the alignment layer and an edge of the alignment layer has a region having nonuniform thickness, it is difficult for an alignment layer to ensure that a display region is covered completely, and ensure a normal display of the display region, while not being interfered with a sealant region.

In order to solve the above technical problem, the present disclosure provides a method for manufacturing a display substrate comprising a display region and a non-display region located in a periphery of the display region, the non-display region comprising a sealant region, the method comprising a step of forming an alignment layer, wherein the step of forming the alignment layer comprise:

placing a shield on the display substrate, wherein an enclosed region is enclosed by the shield, an inner edge of the shield is located between the display region and the sealant region, and an outer edge of the non-display region is located within a region where the shield is located;

forming an alignment film layer on the display substrate and the shield, by using the shield as a barrier;

peeling off the shield to form a patterned alignment film layer;

performing an aligning process to the patterned alignment film layer to form the alignment layer.

In the method as described above, alternatively, an area of the shield is larger than that of the non-display region.

In the method as described above, alternatively, after the step of forming the alignment layer, the method further comprises:

forming the sealant in the sealant region.

In the method as described above, alternatively, the display substrate is an array substrate or a color filter substrate of a liquid crystal display device.

In the method as described above, alternatively, the shield is made of a hard material.

In the method as described above, alternatively, the outer edge of the non-display region coincides with an outer edge of the shield.

In the method as described above, alternatively, the outer edge of the non-display region is located between an inner edge and an outer edge of the shield.

In the method as described above, alternatively, the alignment film layer is liquid.

The present disclosure also provides a display substrate, which is manufactured with the method as described above.

The present disclosure also provides a liquid crystal display device, comprising the display substrate as described above.

In the liquid crystal display device as described above, alternatively, the array substrate and the color filter substrate are adhered to each other by the sealant.

The above technical solution of the present disclosure has the beneficial effects as follows:

In the above technical solution, the alignment film layer is formed on the display substrate and the shield by placing the shield on the display substrate and using the shield as a barrier, wherein, the enclosed region is enclosed by the shield, the inner edge of the shield is located between the display region and the sealant region of the display substrate, and the outer edge of the non-display region of the display substrate is located within the region where the shield is located. Then the shield is peeled off and the aligning process is performed to form the alignment layer. Since the display substrate and the shield is covered by the alignment film layer and the outer edge of the non-display region is located within the region where the shield is located, the edge of the alignment film layer is far away from the display region, which ensures that the display region is covered completely by the formed alignment layer and ensure the normal display of the display region. Meanwhile, since the inner edge of the shield is located between the display region and the sealant region, the formed alignment layer is not interfered with the sealant region and does not affect the product quality.

BRIEF DESCRIPTION OF THE DRAWINGS

In order to more clearly illustrate the technical solutions in the embodiments of the present disclosure, the drawings required in the description of the embodiments will be briefly described below. It should be understood that the following description of the drawings are only some examples of the present disclosure, other drawings may also be obtained according to these drawings for an ordinary person skilled in the art without creative work.

DETAILED DESCRIPTION

In a liquid crystal display device, in order to ensure that a liquid crystal molecule is aligned as required and forms a certain pretilt angle, an alignment layer is formed inside of an array substrate and a color filter substrate, and located at a display region of the liquid crystal display device. A non-display region of the liquid crystal display device includes a sealant region where the sealant is formed. The sealant is used to form a sealed space between the array substrate and the color filter substrate, liquid crystal molecules are filled in the sealed space.

For a narrow-frame liquid crystal display device, the non-display region is very small. Since there is a process deviations for coating the alignment layer and an edge of the alignment layer has a region having nonuniform thickness, it is difficult for the alignment layer to ensure that the display region is covered completely, and ensure the normal display of the display region, while not being interfered with the sealant region and not affecting the product quality.

In view of the problems above, the present disclosure provides a method for manufacturing a display substrate which is an array substrate or a color filter substrate of a liquid crystal display device. In the manufacturing method, before the forming of an alignment layer, a shield is firstly placed on the display substrate, the shield encloses an enclosed region. An inner edge of the shield is located between the display region and the sealant region of the display substrate, and an outer edge of the non-display region of the display substrate is located within the region where the shield is located. Then, with the shield as a barrier, an alignment film layer is formed on the display substrate and the shield. At last, the shield is peeled off and an alignment process is performed to form the alignment layer.

In the technical solution of the present disclosure, since the display substrate and the shield are covered by the alignment film layer and the outer edge of the non-display region is located within the region where the shield is located, the edge of the alignment film layer is far away from the display region, which ensures that the display region is covered completely by the formed alignment layer and ensure a normal display of the display region. Meanwhile, since the inner edge of the shield is located between the display region and the sealant region, the formed alignment layer is not interfered with the sealant region and does not affect the product quality.

The embodiments of the present disclosure will be further described below in detail with the accompanying drawings and the embodiments. The following embodiments are intended to describe the present disclosure, but not to limit the scope of the disclosure.

First Embodiment

Figure 1:
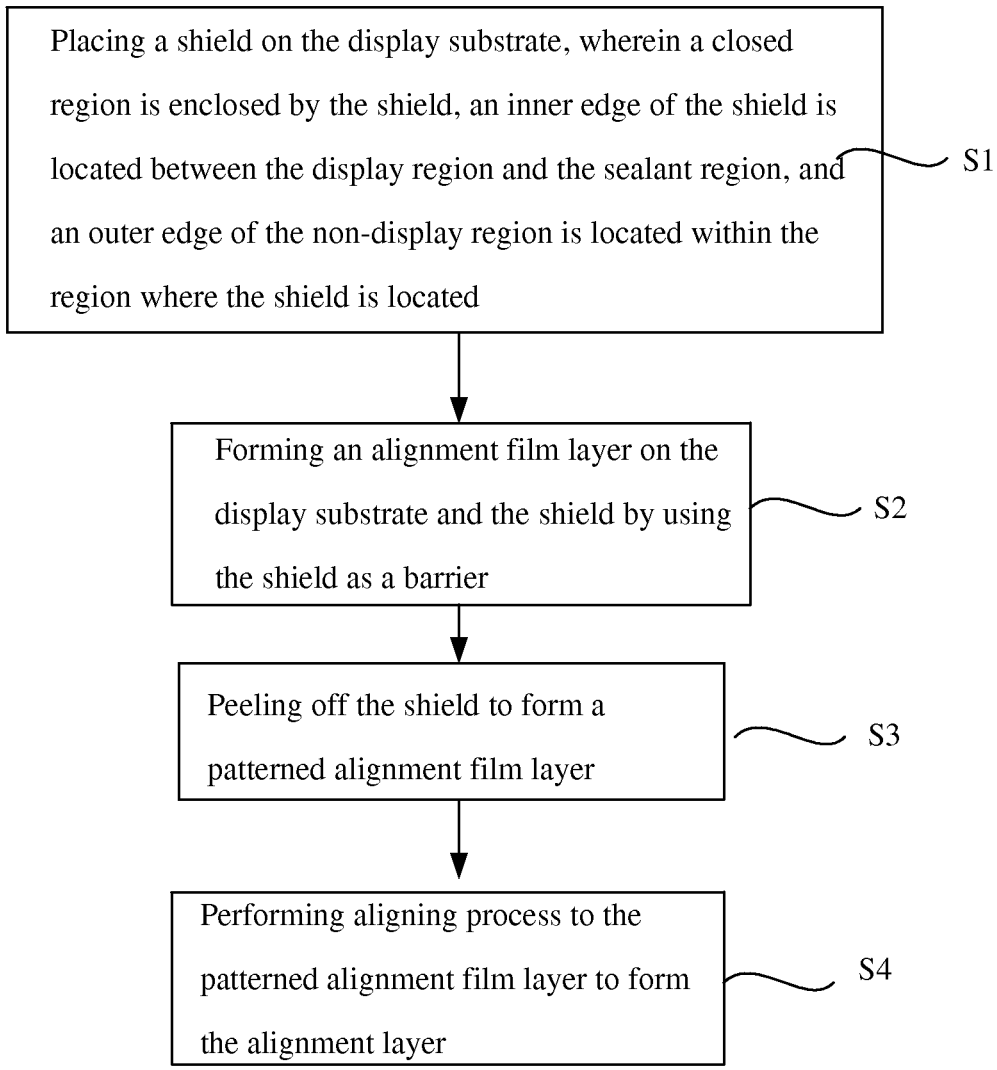
FIG. 1 is a flow chart illustrating the manufacturing process of an alignment layer according to an embodiment of the present disclosure.

As shown in FIG. 1, the embodiment of the present disclosure provides a method for manufacturing a display substrate. The display substrate is an array substrate or a color filter substrate of a liquid crystal display device, the display substrate includes a display region and a non-display region located in a periphery of the display region. The non-display region includes a sealant region.

The manufacturing method includes a step of forming an alignment layer, which includes:

Step S1, placing a shield on the display substrate, wherein an enclosed region is enclosed by the shield, an inner edge of the shield is located between the display region and the sealant region, and an outer edge of the non-display region is located within a region where the shield is located;

Specifically, the material of the shield may be a plastic film or other hard material, which can be used once or repeatedly.

Step S2, forming an alignment film layer on the display substrate and the shield by using the shield as a barrier;

Since the display substrate and the shield are covered by the alignment film layer, the edge of the alignment film layer is far away from the display region, which ensures that the display region is covered completely by the alignment layer formed subsequently and the thickness of the alignment layer covering the display region is uniform.

Step S3, peeling off the shield to form a patterned alignment film layer.

Step S4, performing an aligning process to the patterned alignment film layer to form the alignment layer.

The alignment film layer forms the alignment layer by a patterning process in Step S3 and the aligning process in Step S4.

The Alignment layer formed by the above steps can cover the display region completely, which ensure a normal display of the display region. Meanwhile, since the inner edge of the shield (corresponding to the edge of the alignment layer) is located between the display region and the sealant region, the alignment layer is not interfered with the sealant region and does not affect the product quality.

Alternatively, the area of the shield is set to be larger than that of the non-display region to further increase the distance from the edge of the alignment layer to the display region.

After forming the alignment layer, the sealant is formed in the sealant region of the non-display region.

The detailed process of forming the alignment layer in this embodiment is as follows.

Figure 2:
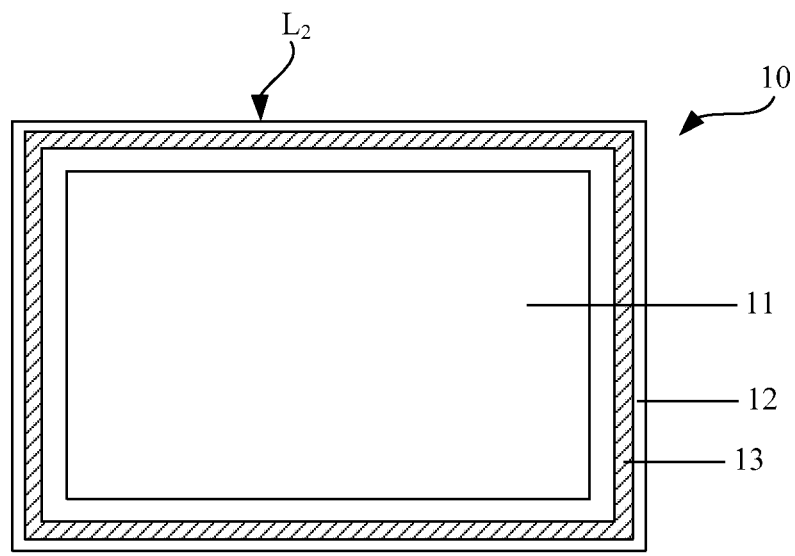
FIGS. 2 to 6 are schematic views illustrating the manufacturing process of a display substrate according to an embodiment of the present disclosure.

A display substrate 10 is provided, the display substrate includes a display region 11 and a non-display region 12, the non-display region includes a sealant region 13, as shown in FIG. 2.

Figure 3:
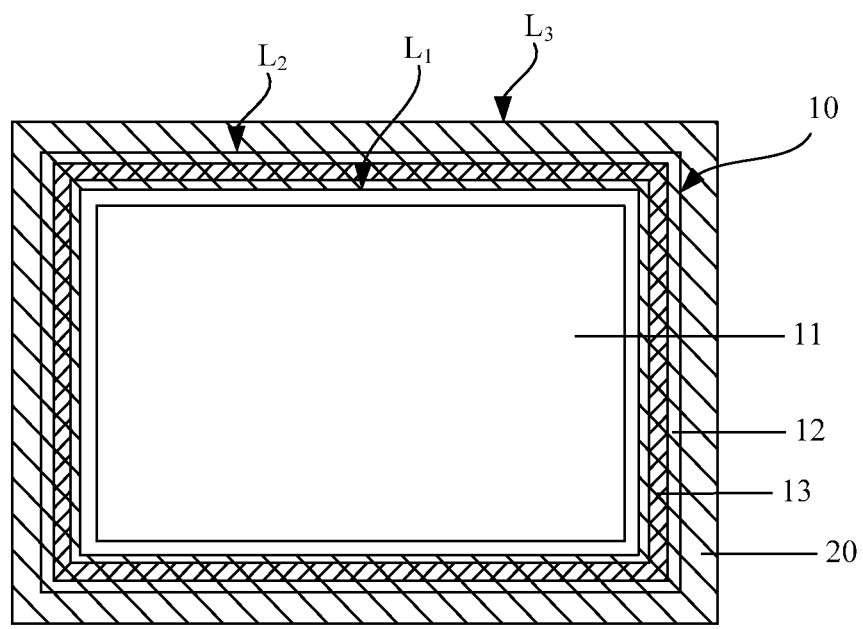

Step S100, placing a shield 20 on the display substrate 10, wherein an enclosed region is enclosed by the shield 20, an inner edge $L_1$ of the shield 20 is located between the display region 11 and the sealant region 13, and an outer edge $L_2$ of the non-display region 12 is located within a region where the shield 20 is located, as shown in FIG. 3.

It should be noted that the inner edge and the outer edge of a certain region in the present disclosure is defined by taking the center of the display substrate 10 as a reference, that is, an edge, close to the center of the display substrate 10, in the region is the inner edge, while an edge, away from the center of the display substrate 10, is the outer edge. For example, as shown in FIG. 2, $L_2$ is the outer edge of the annular non-display region 12. And as shown in FIG. 3, $L_1$ is the inner edge of the shield 20 and $L_3$ is the outer edge of the shield 20.

That the outer edge $L_2$ of the non-display region 12 is located within the region where the shield 20 is located, includes:

the outer edge $L_2$ of the non-display region 12 coincides with the outer edge $L_3$ of the shield 20; or the outer edge $L_2$ of the non-display region 12 is located between the inner edge $L_1$ and the outer edge $L_3$ of the shield 20, as shown in FIG. 3.

Figure 4:
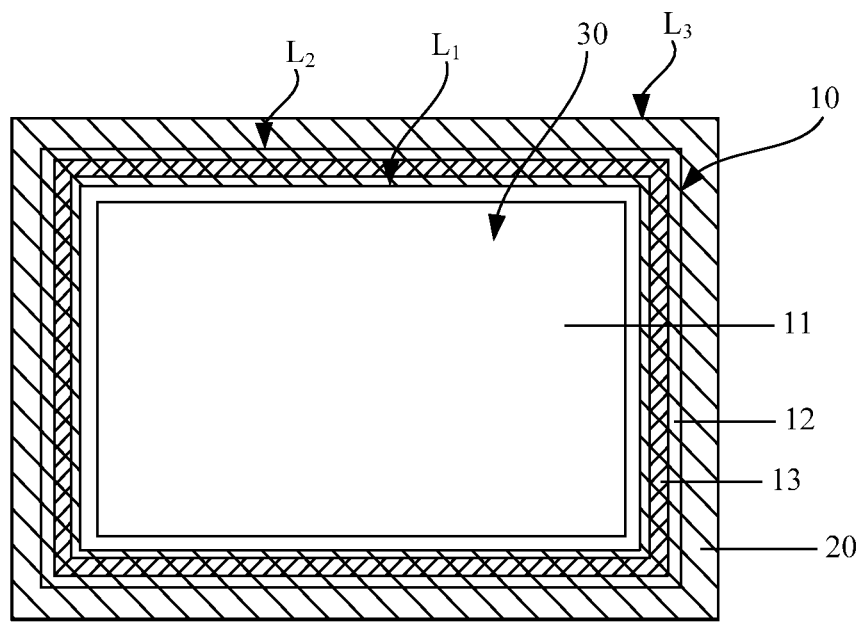

Step S101, as shown in FIG. 4, with the shield 20 as a barrier, forming an alignment film layer 30 on the display substrate 10 and the shield 20.

The alignment film layer 30 is a unpatterned film layer, and covers the display substrate 10 and the shield 20.

The edge of the alignment film layer 30 is located at the outer edge $L_3$ of the shield 20, far away from the display region 11 of the substrate 10, which ensures that the display region 11 is covered completely by the alignment film layer 30 and the thickness of the alignment film layer 30 covering the display region 11 is uniform.

Figure 5:
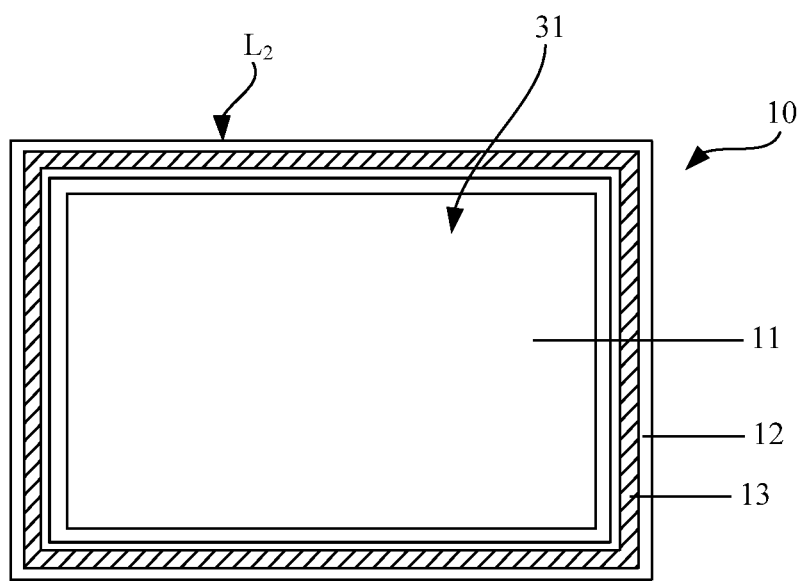

Step S102, as shown in FIG. 5, peeling off the shield 20 so as to form a patterned alignment film layer 31.

In this step, since the alignment film is liquid, the alignment film in the region which is covered by the shield 20 is peeled off along with the peeling off of the shield 20, while the alignment film in the region which is not covered by the shield 20 is retained so as to form the patterned alignment film layer.

The edge of the patterned alignment film layer 31 is located between the display region 11 and the sealant region 13, which is not interfered with the sealant region and does not affect the product quality.

Figure 6:
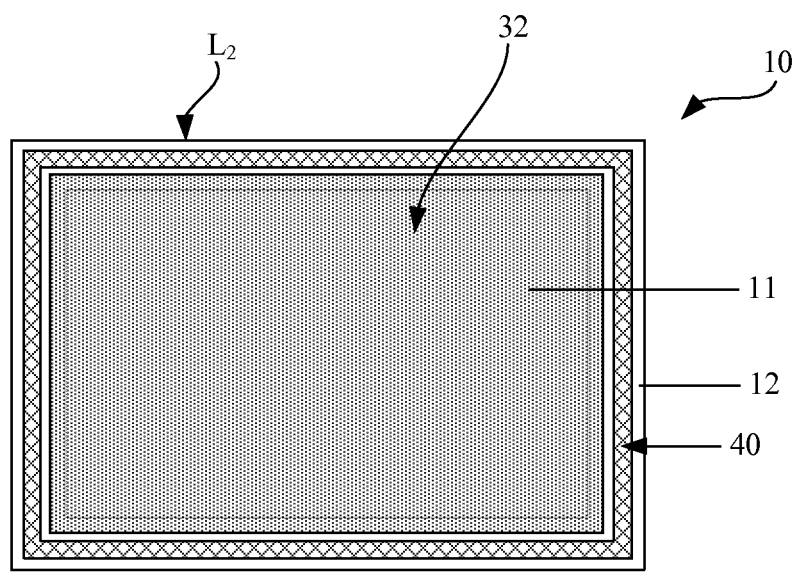

Step 103, as shown in FIGS. 5 and 6, performing an aligning process to the patterned alignment film layer 31 to form the alignment layer 32.

At this point, the manufacturing of the alignment layer 32 is finished.

After forming the alignment layer 32, the sealant 40 is formed in the sealant region 13, as shown in FIGS. 5 and 6.

After finishing the manufacturing of the alignment layer and the sealant by the above steps, the array substrate and the color filter substrate of the liquid crystal display device are arranged oppositely to form a cell. Then, the liquid crystal molecules are injected into the sealed space between the array substrate and the color filter substrate. At last, the sealant is solidified to finish the manufacturing of the panel of the liquid crystal display device.

The manufacturing process before those of the alignment layer and the sealant may refer to those of the array substrate and the color filter substrate in the prior art, which will be omitted here.

Second Embodiment

Based on the same inventive concept, an embodiment of the present disclosure further provides a display substrate, in particularly, an array substrate or a color filter substrate of a liquid crystal display device. The display substrate is manufactured by using the method in the first Embodiment.

Due to the display region is covered completely by the formed alignment layer, the normal display of the display region is ensured. Meanwhile, since the edge of the formed alignment layer is located between the display region and the sealant region, the alignment layer is not interfered with the sealant region and the product quality is ensured.

Third Embodiment

An embodiment of the present disclosure further provides a liquid crystal display device. The liquid crystal display device includes an array substrate and a color filter substrate.

The array substrate or the color filter substrate is the display substrate in the second embodiment so as to ensure the product quality.

The array substrate and the color filter substrate of the liquid crystal display device are adhered to each other by the sealant to form a sealed space for filling liquid crystal molecules.

The present disclosure ensures that the display region is covered completely by the formed alignment layer, and ensures the normal display of the display region. Meanwhile, since the edge of the formed alignment layer is located between the display region and the sealant region, the alignment layer is not interfered with the sealant region and does not affect the product quality.

The above are merely the preferred embodiments of the present disclosure. It should be noted that modifications and alterations may be made without departing from the principle of the present disclosure for an ordinary person skilled in the art, and all these modifications and alterations should also be considered to fall within the scope of the present disclosure.

What is claimed is:

1. A method for manufacturing a display substrate comprising a display region and a non-display region located in a periphery of the display region, the non-display region comprising a sealant region, the method comprising a step of forming an alignment layer, wherein the step of forming the alignment layer comprises:

placing a shield on the display substrate, wherein an enclosed region is enclosed by the shield, an inner edge of the shield is located between the display region and the sealant region, and an outer edge of the non-display region is located between an inner edge and an outer edge of the shield;

forming an alignment film layer on the display substrate and the shield by using the shield as a barrier;

peeling off the shield to form a patterned alignment film layer;

performing an aligning process to the patterned alignment film layer to form the alignment layer.

2. The method according to claim 1, wherein an area of the shield is larger than that of the non-display region.

3. The method according to claim 1, wherein after the step of forming the alignment layer, the method further comprises:

forming the sealant in the sealant region.

4. The method according to claim 1, wherein the display substrate is an array substrate or a color filter substrate of a liquid crystal display device.

5. The method according to claim 2, wherein the display substrate is an array substrate or a color filter substrate of a liquid crystal display device.

6. The method according to claim 3, wherein the display substrate is an array substrate or a color filter substrate of a liquid crystal display device.

7. The method according to claim 1, wherein the shield is made of a hard material.

8. The method according to claim 2, wherein the shield is made of a hard material.

9. The method according to claim 3, wherein the shield is made of a hard material.

10. The method according to claim 1, wherein the outer edge of the non-display region coincides with an outer edge of the shield.

11. The method according to claim 1, wherein the alignment film layer is liquid.

12. A display substrate, which is manufactured with the method according to claim 1.

13. The display substrate according to claim 12, wherein an area of the shield is larger than that of the non-display region.

14. The display substrate according to claim 12, wherein the sealant is formed in the sealant region.

15. The display substrate according to claim 12, wherein the display substrate is an array substrate or a color filter substrate of a liquid crystal display device.

16. The display substrate according to claim 12, wherein the shield is made of a hard material.

17. The display substrate according to claim 12, wherein the alignment film layer is liquid.

18. A liquid crystal display device, comprising an array substrate and a color filter substrate, the array substrate or the color filter substrate is the display substrate according to claim 12.

19. The liquid crystal display device according to claim 18, wherein the array substrate and the color filter substrate are adhered to each other by the sealant.

* * * * *